D. BRENNAN, Jr.
MACHINE FOR MAKING BLOCKS.
APPLICATION FILED FEB. 17, 1908.

1,124,846.

Patented Jan. 12, 1915.

D. BRENNAN, Jr.
MACHINE FOR MAKING BLOCKS.
APPLICATION FILED FEB. 17, 1908.

1,124,846.

Patented Jan. 12, 1915.
9 SHEETS—SHEET 7.

Witnesses:
G. V. Rasmussen
John Lotka

Inventor
DANIEL BRENNAN Jr
By his Attorneys
Briesen & Knauth

D. BRENNAN, Jr.
MACHINE FOR MAKING BLOCKS.
APPLICATION FILED FEB. 17, 1908.

1,124,846.

Patented Jan. 12, 1915.
9 SHEETS—SHEET 9.

Witnesses:
G. V. Rasmussen
John Lotka

Inventor
DANIEL BRENNAN Jr.
By his Attorneys
Briesen + Knauth

UNITED STATES PATENT OFFICE.

DANIEL BRENNAN, JR., OF NEW YORK, N. Y.

MACHINE FOR MAKING BLOCKS.

1,124,846. Specification of Letters Patent. Patented Jan. 12, 1915.

Application filed February 17, 1908. Serial No. 416,250.

*To all whom it may concern:*

Be it known that I, DANIEL BRENNAN, Jr., a citizen of the United States, and resident of the borough of Manhattan, city, county, and State of New York, have invented certain new and useful Improvements in Machines for Making Blocks, of which the following is a specification.

My invention relates to machines for making blocks, particularly from asphaltic concrete or from rock asphalt. The formation of the blocks takes place under high pressure produced by hammer blows.

The machine embodies a number of novel features for increasing their efficiency and the durability of the machine as well as improving the quality of its product.

A machine containing my improvements is illustrated in the accompanying drawings, in which—

Fig. 4 is a front elevation of the rotary table and the mechanism connected therewith; Fig. 5 is a plan view of the machine with parts in section; Fig. 5$^a$ is a diagram illustrating a slightly different arrangement of parts; Fig. 7 is a similar view, with the table seat, follower, and hammer removed; Fig. 7$^a$ is a vertical detail section on line 7$^a$—7$^a$ of Fig. 7; Fig. 11 is a vertical section on line 11—11 of Fig. 10; Fig. 12 is a vertical section of a cleaning and lubricating device, taken on line 12—12 of Fig. 10; Fig. 14$^a$ is a section of one of the molds on an enlarged scale; Fig. 17 is a vertical section showing a detail of the ejector; Fig. 17$^a$ is a horizontal section on line 17$^a$—17$^a$ of Fig. 17.

Figure 2:
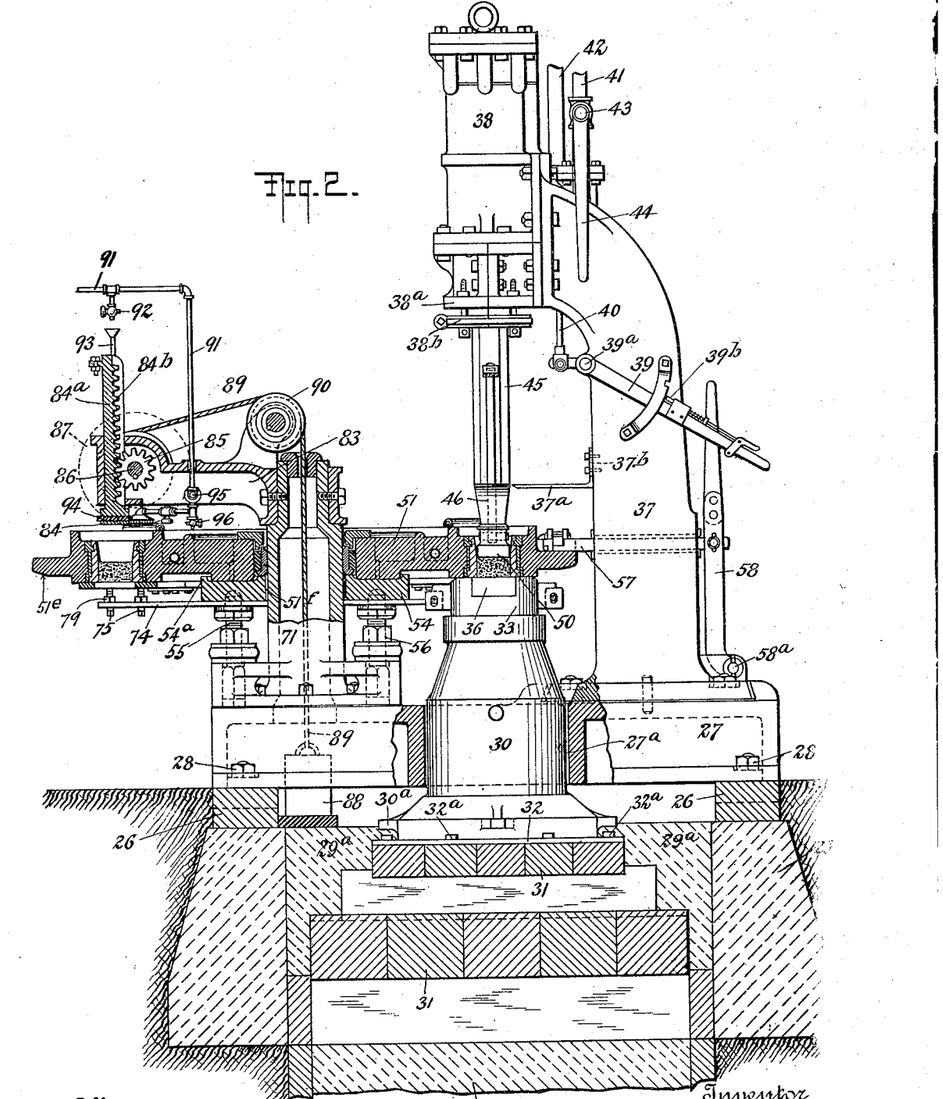
Fig. 2 is a vertical section, with the hammer in side elevation.
Figures 3, 13, 14:
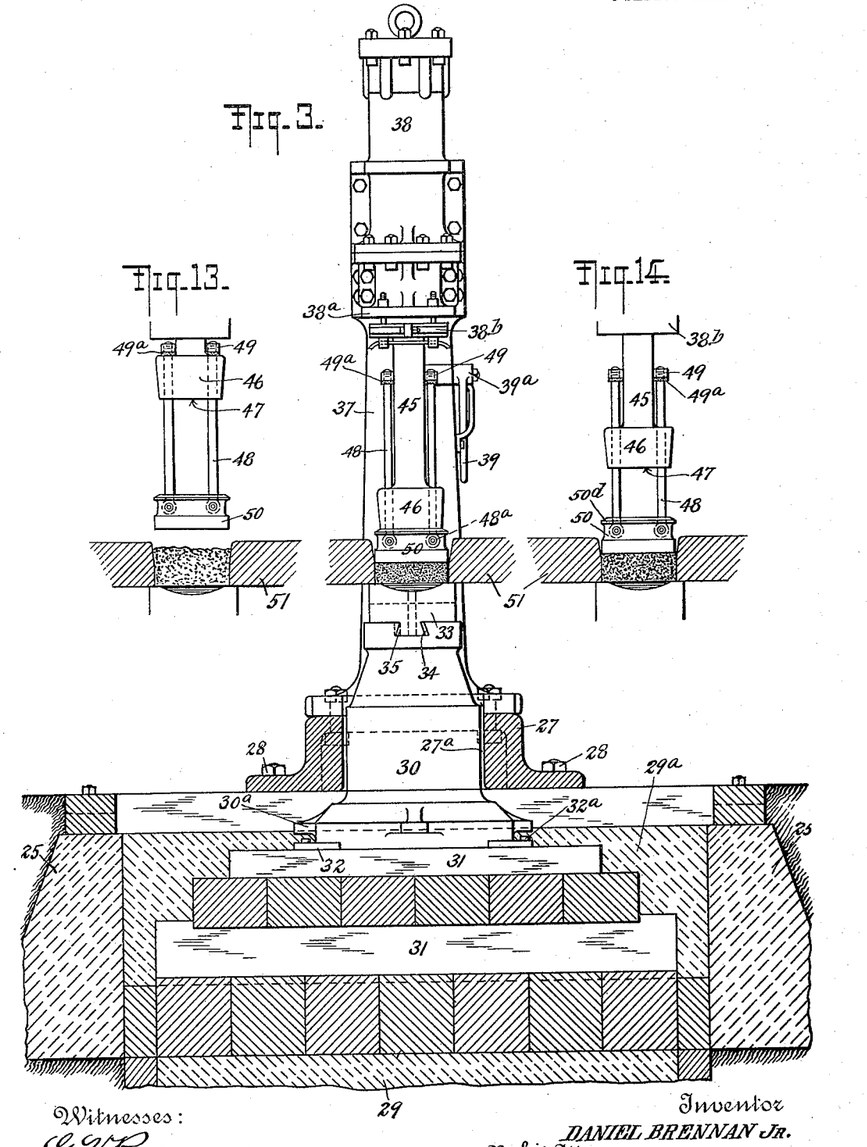
Fig. 3 is a front elevation with parts in section.
Figs. 13 and 14 are vertical sections showing the hammer in two different positions.
Figures 9, 19:
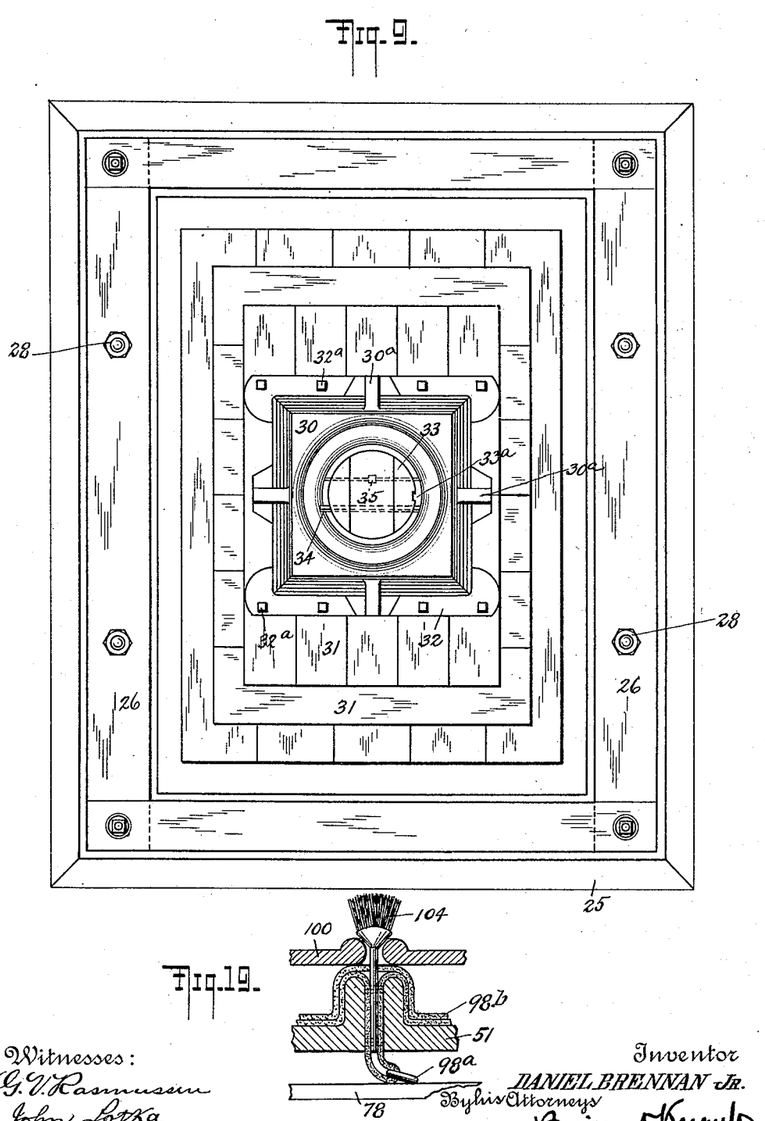
Fig. 9 is a plan view showing the anvil and its foundation.
Fig. 19 is a vertical section, corresponding to the central portion of Fig. 12, but showing a brush as a lubricating and cleaning device.

The foundation consists of a complete hollow pillar of masonry or concrete 25 of rectangular shape in horizontal section, but it may be sufficient to employ only the two opposite walls or piers which are shown in cross-section in Figs. 2 and 3. On these piers or pillar rest timbers 26 to which the bed frame 27 is bolted as at 28. The upper surface of the timbers is shown flush with the ground, and the pillar or piers 25 need only extend below the frost line. In the space within the pillar, or between the walls thereof, is located a separate foundation for the anvil 30. This foundation preferably comprises a concrete layer or block 29 and a pier of timbers 31 laid alternately in directions at a right angle to each other. A certain degree of elasticity is thus given to the anvil foundation enabling the anvil to move elastically in relation to the bed plate 27. The anvil foundation is preferably deeper than that carrying the bed-plate. The anvil is held in place on the uppermost timbers 31 by means of clamps 32 (Fig. 9) fitted to opposite sides of the anvil and embracing the corners thereof and fastened by means of spikes or lag screws 32$^a$. The anvil should be easily leveled up or shifted into line by means of wedges, liners, etc., if it becomes displaced. This adjustability of the anvil with reference to the bed-plate is of importance in view of the fact that the anvil always settles more or less from use. To enable the anvil to be readily moved by means of crow-bars or the like, it is provided with lugs or projections 30$^a$ overhanging the filling 29$^a$ (of concrete or the like) which is placed between the bed-plate and the timbers 31. The anvil 30 extends upward from its foundation 29, 31, passing loosely through an opening 27$^a$ in the bed-plate 27 and carries at its upper end a top or cap 33 dovetailed to the anvil above the floor line, and held by a longitudinal key 34 and a short vertical key 35. This cap carries a hard steel die 36 pocketed therein and held in position by the pallet as fully explained below. The anvil top 33 may thus be removed and renewed when required.

On the bed-plate 27 is carried the upright 37 for the cylinder 38 of a steam-hammer or compressed air hammer, the interior construction of which need not differ materially from the well known construction of steam hammers. The customary handle 39, fulcrumed at 39ᵃ controls a rod 40 for operating the usual valve governing the steam hammer. A latch 39ᵇ may be provided for holding the handle 39 in the position corresponding to the raised position of the hammer. The steam or other driving medium enters through the pipe 41 and exhausts through the pipe 42; a cut-off valve 43 may be operated by a handle 44. These parts may be of any usual or approved construction. The piston (not shown) is rigidly connected with the piston rod 45 extending through the lower cylinder head 38ᵃ, and flattened on opposite sides so as to prevent its turning in the cylinder head. The piston rod 45 passes through a stuffing box 38ᵇ secured to the lower end of the cylinder and to the frame. At the lower end of the piston rod is located the hammer head 46 preferably forged in one piece therewith. The entire upper area of the piston should be exposed to the steam or other driving medium, and for this reason it would be undesirable to extend the piston rod through the cylinder head above the piston. The lower face 47 of the hammer is considerably smaller than the mold fully described hereinafter. The head is approximately rectangular and oblong, and at each side is bored a hole for the passage of a sliding rod 48, the upper end of which has a flattened face or square head which may be formed by a nut 49. The rods 48 are elastic enough to be bent and thus allow the nuts to be turned to adjust the extent of the relative movement of the follower and hammer, and when the rods are released the sides of the nuts will engage the flat faces of the piston rod 45, so that the nuts are prevented from turning, thus preserving their adjustment. Washers or cushions 49ᵃ may be placed on the rods 48 below the nuts 49, to be engaged by the hammer 46 when it moves upward. The lower ends of the rods 48 are formed with eyes 48ᵃ surrounding keys 50ᵃ, with bushings 50ᵇ of wood, rubber, or other suitable elastic material intervening between the eyes and the keys to reduce jars. The keys 50ᵃ, turned larger than the holes in the follower 50 which receive them, are tubes split lengthwise, giving them a tendency to expand and fit tightly in the openings. Before the key is inserted, its diameter is greater than that of the follower opening. One end 50ᶜ of each key is beveled to facilitate its insertion. It will be seen that a slight pivotal movement is possible between the follower 50 and the rods 48, so that the follower 50 will adjust itself to a perfect engagement with the hammer head when struck thereby. The top of the follower is of the same size as the bottom of the hammer head, but the body and the lower face of the follower are larger to fit the mold approximately. The hammer is made smaller than the mold for the purpose of avoiding the formation of an air-cushion in the mold. The rods 48 besides carrying the follower 50, serve to preserve the proper relation of the hammer to the follower, and as above stated, the nuts 49 afford a means for adjusting the extent to which the hammer may move independently of the follower. The eyes 48ᵃ and keys 50ᵃ are received in recesses of the follower 50, the recesses being closed at the top by cover plates 50ᵉ. The keys are held in position by wooden pins 50ᵈ, and should it be desired to remove one of the keys, the corresponding pin is simply sheared off by blows on the projecting end of the key. The follower is provided at its upper portion with an outwardly projecting flange or lip 50ᶠ, preferably with a concave surface immediately below it. This flange acts as a deflector to throw outward upon the mold table any dirt or loose material which may be blown upward from the mold, and thus prevents the mold from becoming clogged.

The piston rod 45, hammer head 46 and follower 50 of course move in line with the anvil 30, and by a proper manipulation of the lever 39, the operator can either exert a prolonged pressure by means of the hammer head, or deliver a blow or a succession of them, the strength and duration of the pressure or blow being under the control of the operator. The length of the rods 48 should be such that when the hammer head is in its uppermost position (Fig. 13) it will, by engagement with the heads or nuts 49, (or their cushions 49ᵃ) raise the follower 50 clear of the mold and mold-table.

To enable the operator to ascertain the completion of the operation, a gage or indicator 37ᵃ is secured to the upright 37, and this indicator is adjustable vertically by means of a screw- and -slot connection 37ᵇ, since the final thickness of the blocks need not always be the same.

The mold table 51 (see particularly Figs. 2 and 11) is a heavy casting with cored holes arranged at equal distances from its center. In the drawing there are six such holes, each adapted to receive a mold 52. The molds are open at the top and at the bottom; their cavities are of uniform width at their lower portions, but flare at the top. Each mold is provided on its outer surface, near the top, with a recess or groove 52ᵃ arranged slightly above shelves 51ᵃ in the holes of the mold table. The molds 52 are so much smaller than said holes as not to come into contact with the walls thereof, and the intervening space is filled with holding material 53 such as zinc. The lower ends of the molds are preferably thickened in the stem and have flanges 52ᵇ for the purpose of facilitating removal of the molds and of strengthening that portion which bears the greatest strain; a recess 51$^b$ is provided adjacent to said flange, which overlaps the edges of the hole in the table all around.

The manner of inserting and removing the molds is as follows: The mold is inserted from below, the flange 52$^b$ stopping its upward movement by engaging the shoulder above the recess 51$^b$; this is done while the respective hole of the table is in the position shown at the left in Figs. 2 and 11, registering with the hole 76$^a$ of a non-rotating support or pallet (Figs. 7 and 8) more fully described hereinafter. Then by giving the table 51 half a revolution, the mold, resting meanwhile on said pallet, is brought to the position shown at the right in Figs. 2 and 11, that is, below the hammer 46, and on top of the anvil 30. The table resting fairly on the flange 52$^b$ of the mold, the follower 50 and hammer head 46 are carefully lowered into the mold 52 so as to hold it steady. The table having been properly adjusted so that the mold is centered within the opening of the mold table, melted zinc or other suitable material is poured into the space around the mold. To remove the mold, the zinc is cut out around the top down to the level of the shelves 51$^a$, and the mold can then be removed downward when in the position shown at the left in Figs. 2 and 11. I may thus substitute molds having approximately the same external dimensions, but differing in the shape or size of their cavity, so that blocks of various shapes or sizes may be made on the same machine. The open bottom of the mold is closed by the anvil (specifically, by the die 36 thereof) when the mold is in operative relation to the hammer. The opening of the mold at the top should leave a clearance of about $\frac{1}{4}$ of an inch all around the lower portion of the follower 50, and the chamber at the lower portion of the mold should leave a clearance of about $\frac{1}{16}$ of an inch all around the lower portion of the follower. It will, of course, be understood that whenever different molds are substituted, the follower will be changed to match.

The table 51 is arranged to rest and turn upon a stationary seat 54, which is a ring made of cast iron or steel, and having a lip 54$^a$ to form a lubricant-holding chamber. The lower surface of the table seat is provided with recesses 54$^b$ to receive the upper ends of screws 55 adjustably supported on the frame. The lower ends of the screws are angular so that they can slide up and down but cannot turn. The screws are raised or lowered by turning nuts 56; between these nuts and the top of the frame are interposed washers 56$^a$ separated by a (rubber) cushion 56$^b$. By these means the table can be leveled or set out of level as desired.

Figures 4, 17, 17A:
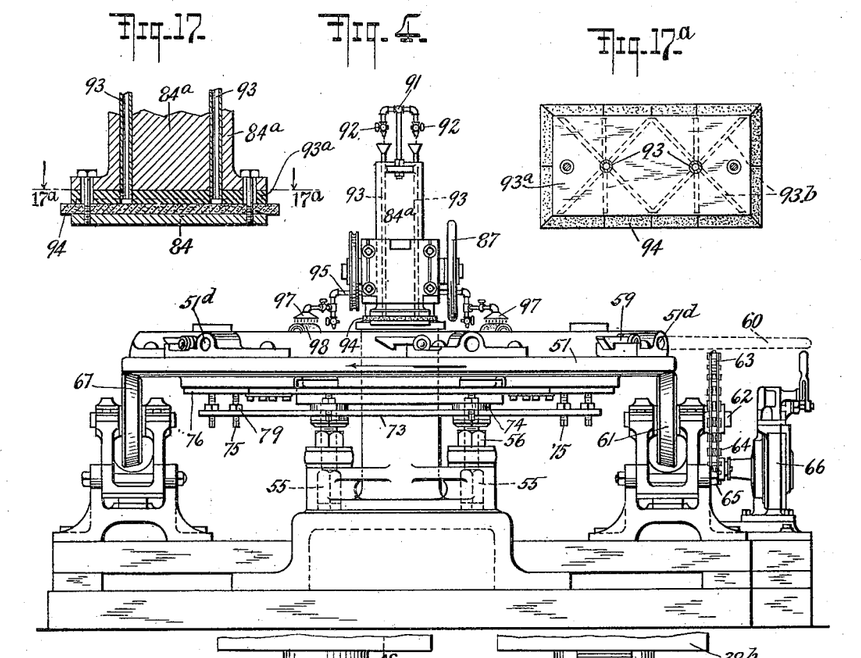
Figures 5, 5A:
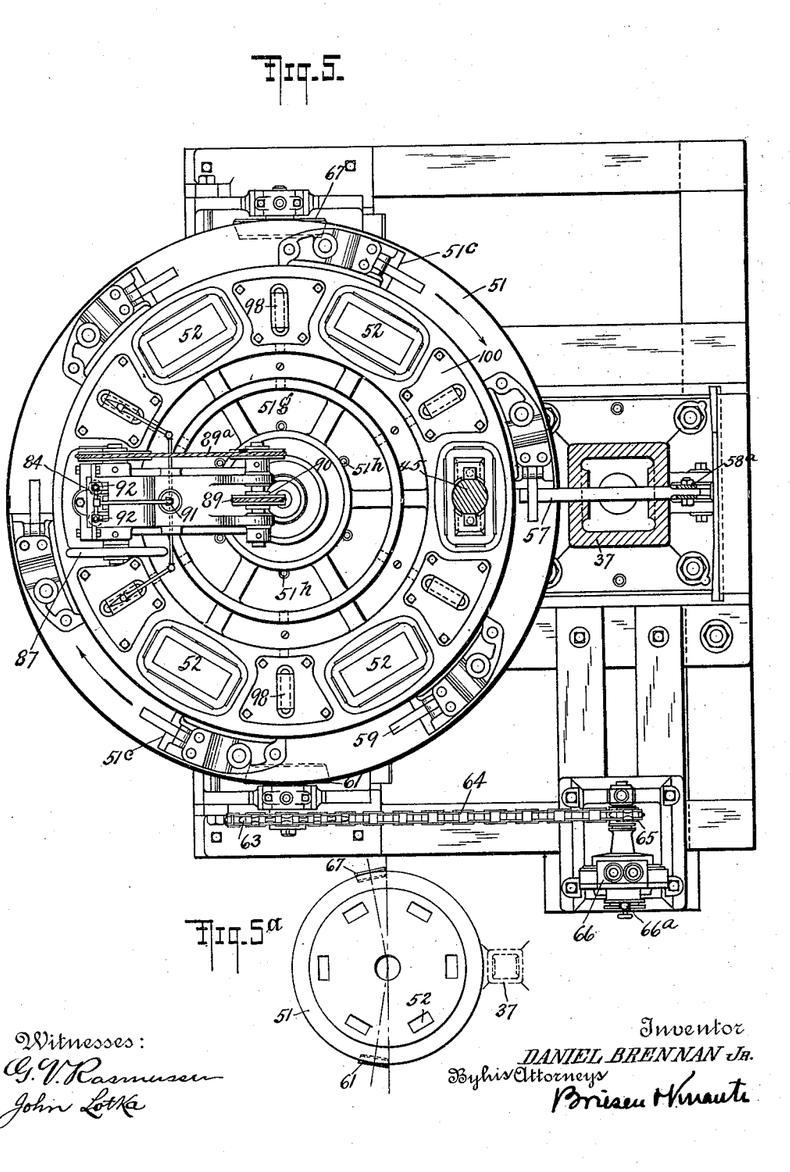

To stop the mold table in the proper position, I may provide a locking bar 57 mounted to slide in the upright 37 and operated by a lever 58 fulcrumed at 58$^a$. The inner end of the locking bar is adapted to engage the beveled end 59$^a$ of a catch or pawl 59 fulcrumed on the table at 59$^b$, and after raising the catch the locking bar will engage a stop surface 51$^c$ on the table, the catch at the same time dropping behind the locking bar so as to prevent any accidental rebound of the table. The operator (of the ejector) may turn the table, when required, by means of a stick or bar 60 (Fig. 4) which he would insert in any one of a series of radial holes 51$^d$ of the table. As the table is rather heavy, it is desirable to facilitate its rotation; for this purpose the table is made with a friction surface 51$^e$ (beveled as shown) which is engaged by a friction wheel 61 on a shaft 62 carrying also a sprocket wheel 63 driven by a chain 64 from a sprocket wheel 65 on the shaft of a suitable motor 66, having no dead center, such as a Dake engine. This motor during the running of the machine, always has a tendency to turn the table 51 in the direction of the operation, but is not strong enough to start the table; it, however, greatly reduces the physical effort which the operator has to apply to start the table. The table, therefore, remains under manual control, but is moved very easily. A supporting wheel 67 may engage the table 51 at a point diametrically opposite the friction wheel 61. In practice, it may be preferable to have the wheels 61 and 67 engage the table not at diametrically opposite points, as in Fig. 5, but a little toward the ejector, as indicated in Fig. 5$^a$, so that the table 51 instead of being balanced, will have a greater part of its weight on the side of the anvil 30. The motor may be provided with an adjusting handle 66$^a$ controlling its speed or power. During the normal operation of the machine, the controller or handle 66$^a$ will be set to produce the result above described, that is, the motor will be unable to start the mold table, but will be able to keep it turning after it has been started manually. In some cases it may be desirable, before the machine is used to make blocks, to continuously rotate the table at a high rate of speed so as to secure a thorough lubrication of the various parts of the table, follower, and ejector before the actual pressing or block-making operation is begun.

Figure 10:
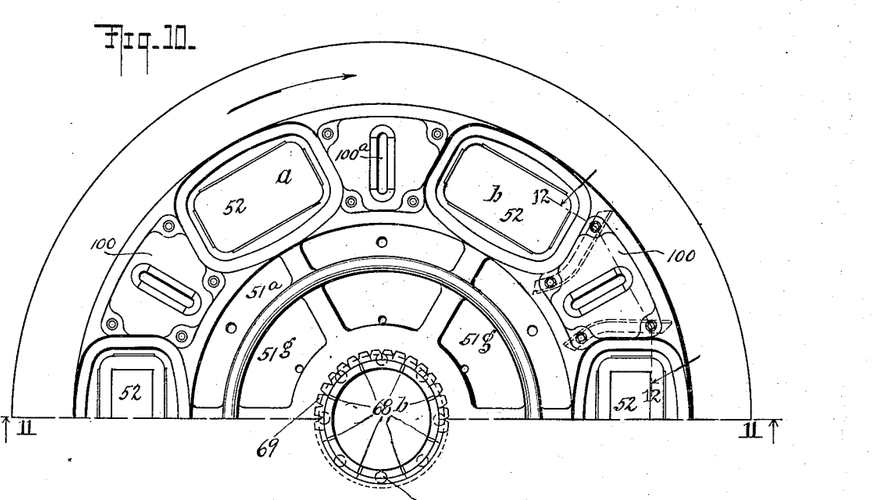
Fig. 10 is a plan view of a portion of the rotary mold table.
Figures 11, 12, 14A:
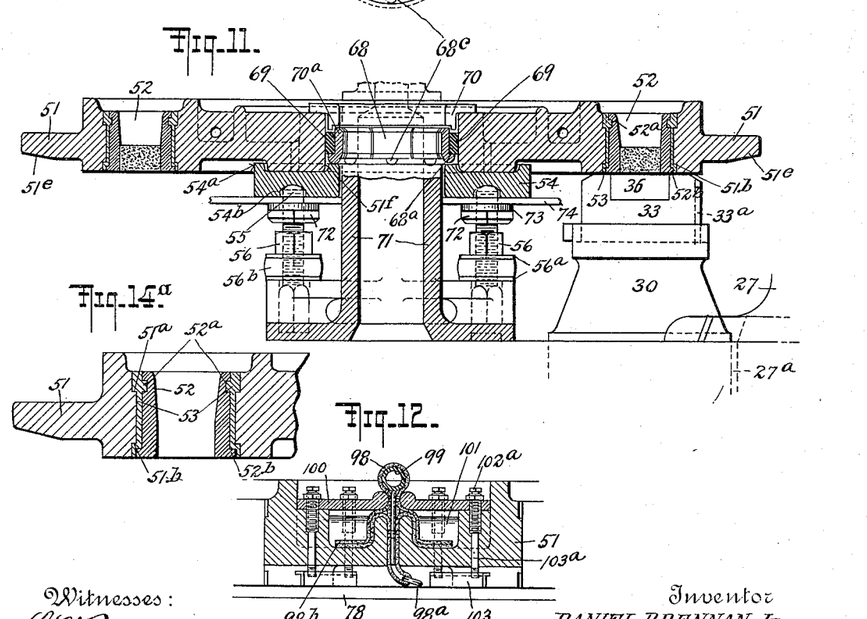
Figures 15, 16:
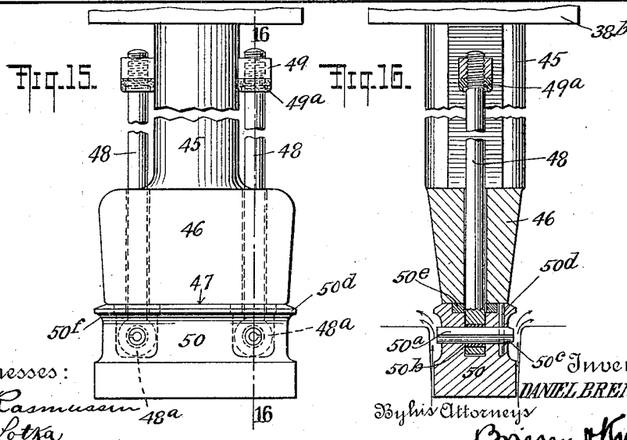
Fig. 15 is a front elevation of the follower, hammer, and connecting parts.
Fig. 16 is a section on line 16—16 of Fig. 15.
Figure 18:
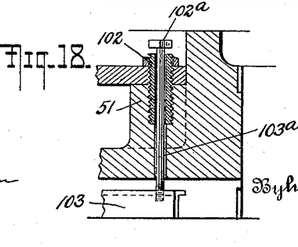
Fig. 18 is a vertical section showing a detail of the pallet scraper.

The table 51 has a central opening 51$^f$ in which is set a cushioned split bushing of peculiar construction (Figs. 10 and 11). The bushing 68 has a bottom flange 68$^a$ and is divided into sections by radial cuts. In the flange 68$^a$ these cuts are quite narrow, but in the body of the bushing (from top to bottom) the cuts are comparatively wide, and the resulting spaces are filled with loose metal pieces 68$^b$. This construction allows the bushing sections to slide on each other and thus to assume a staggered position when the table 51 is inclined. Each of these sections is provided at its bottom with a central rounded projection 68$^c$ engaging the upper surface of the table seat 54. A rocking movement of the bushing sections relatively to the table seat is thus permitted. On the flange or shoulder 68$^a$ are supported a series of tightly fitting rubber blocks 69 engaging the inner wall of the opening 51$^f$. These blocks are preferably beveled at their outer portions to facilitate fitting them in and to provide free spaces in which the blocks may expand under pressure. The bushing rests on the table seat 54 and is held down by a heavy cap 70 which also keeps out dirt and holds the rubber blocks 69 in place; the cap 70 is placed loosely on the central portion or hub of the table 51 and has a flange 70$^a$ surrounding the upper ends of the bushing sections. The inner surface of the bushing 68 engages a stationary pillar 71 secured to the bed-plate 27. This inner surface may be made flaring at the top and the bottom. The elastic bushing, in connection with the elastically supported screws 55, keeps the table properly centered, yet allows it to vibrate or rock and at the same time to revolve freely, even when out of level. Should the table be given any position slanting toward or from the anvil, this will not appreciably change the position of the molds relatively to the operating parts of the machine such as the hammer. Of course, the central opening of the table seat 54 should be sufficiently large to normally keep the seat out of contact with the pillar 71 so as to allow the said seat to be inclined relatively to the pillar within certain limits.

Figure 1:
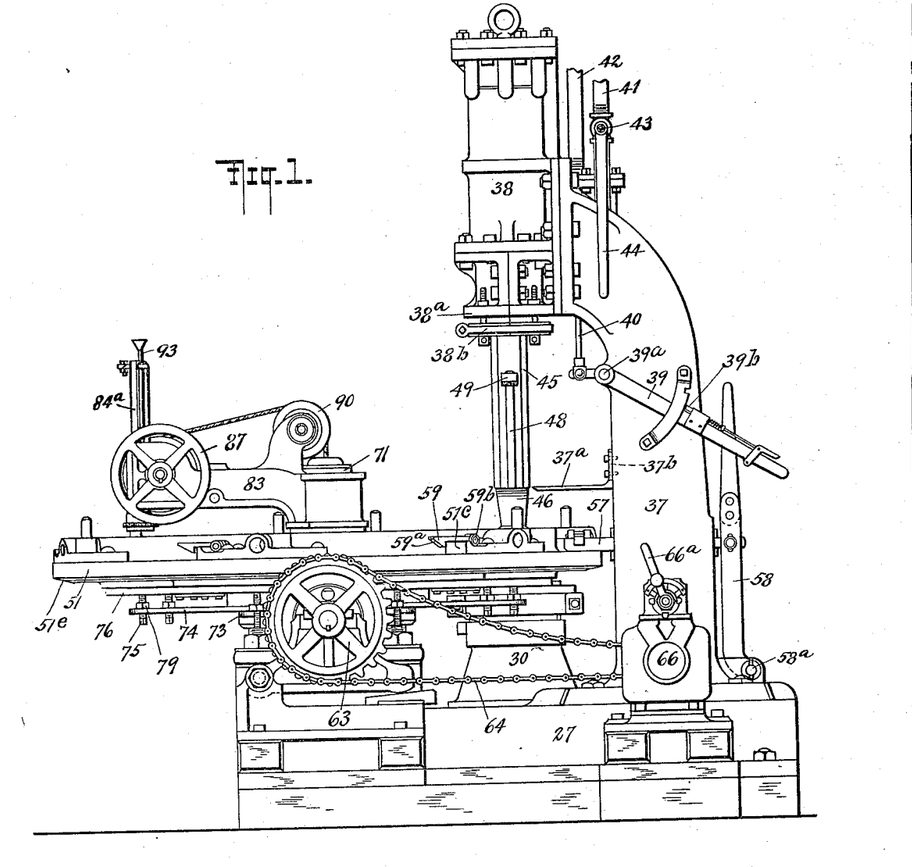
Figure 1 is a side elevation of the machine.
Figure 6:
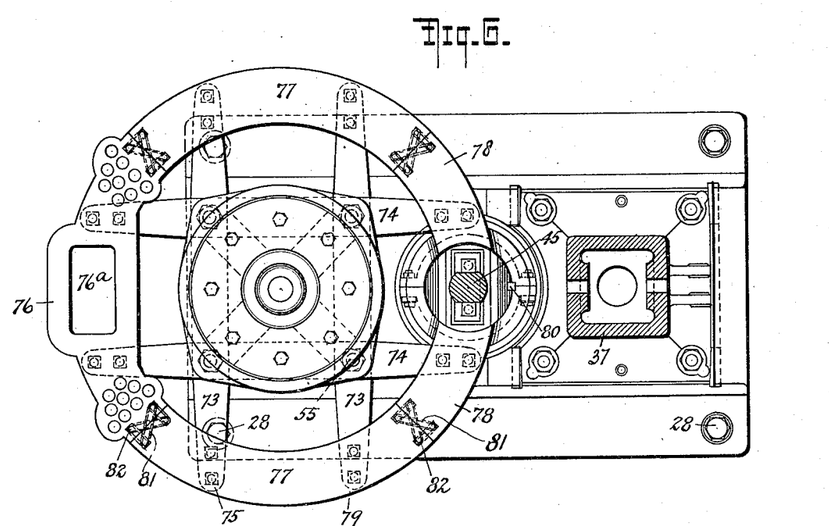
Fig. 6 is a plan view with certain parts removed to show the pallet ring and table seat, and with parts in section.

The screws 55 are provided, above the nuts 56, with adjustable nuts 72 on which rest springs 73 and 74 arranged crosswise and one set above the other, each spring being perforated in two places for the passage of the said screws 55. The ends of the springs are each provided with two threaded holes for the passage of screws 75 the upper end of which engage the pallet sections 76, 77 and 78 respectively. Nuts 79 on said screws engage the springs and prevent accidental turning of the screws. By this construction the distance between the pallet sections and the springs may be adjusted, or in other words, the tension of the individual springs may be varied. The pallet section 76 has an opening 76$^a$ diametrically opposite the anvil 30. The two pallet sections 78 form a hub 78$^a$ fitted to slide up and down on the anvil cap 33 and prevented from turning by a key 80 which extends into a keyway 33$^a$ of the anvil cap (to which it is secured) and into grooves formed on the sections of the hub 78$^a$ (see Figs. 6, 7 and 8). The die 36 is held in place by the hub 78$^a$. The meeting edges of the two sections 78 extend diametrically in relation to the anvil, and the meeting edges of all pallet sections extend radially with reference to the table 51. The sections 77 are alike, being simple ring sectors. Adjacent ends of each two of the five sections are joined by loose connections. The connection may be made flexible by wires 81 wound around pins 82 projected downwardly from the pallet sections. The formation of the wire wrapping is somewhat like an X with horizontal lines at the top and bottom of the X. The two sections 78, which form the hub 78$^a$ are shown connected in a slightly different way. A bolt 78$^b$ extends through flanges on the two hub sections and is passed loosely through at least one of such flanges, thereby permitting one of the sections 78 to drop below its neighbor, as clearly shown in Fig. 7$^a$. In practice the pallet section 78 on the feed side will be kept higher than the one on the side toward the ejector. Thus as the block travels toward the ejector it will, as soon as it gets out of contact with the anvil, have a tendency to drop on the lowered pallet section 78, thereby facilitating separation of the block from the mold. The upper surface of the pallet is continuous and smooth between the opening 76$^a$ and the opening of the hub 78$^a$. The pallet while guided by the hub 78$^a$ and anvil cap 33, is supported exclusively by the springs 73 and 74. The pillar 71 also serves as a support for the stationary arm 83 (Figs. 1 and 2) in which an ejector 84 is movable vertically, said ejector registering with the pallet opening 76$^a$. The stem 84$^a$ of the ejector has a rack 84$^b$ in mesh with a pinion 85 on a shaft 86 which may be rotated by means of a hand wheel 87. The ejector may be returned to its raised position, as soon as the hand wheel is released, by a counterweight 88 from which a cord or wire 89 passes through the hollow pillar 71 and to a pulley 90 from which another cord 89$^a$ passes to the shaft 86.

Figures 7, 7A:
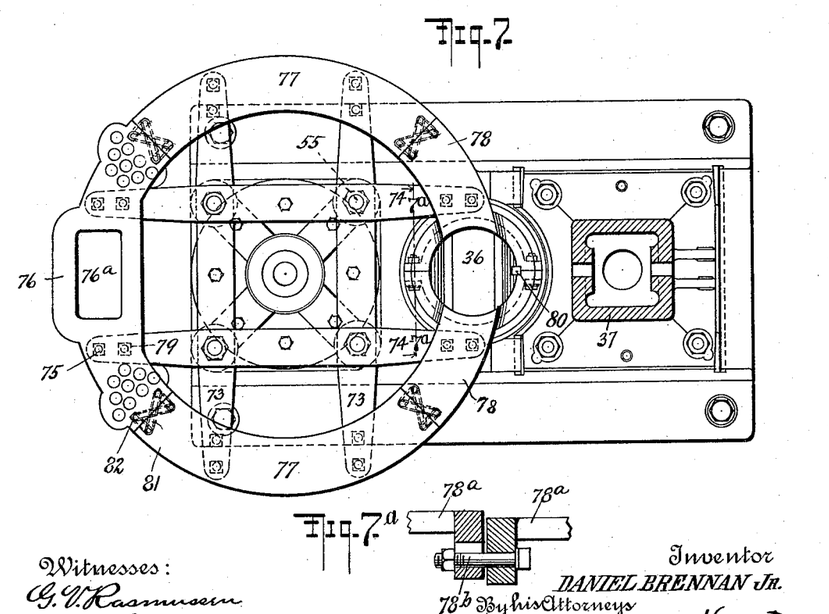
Figure 8:
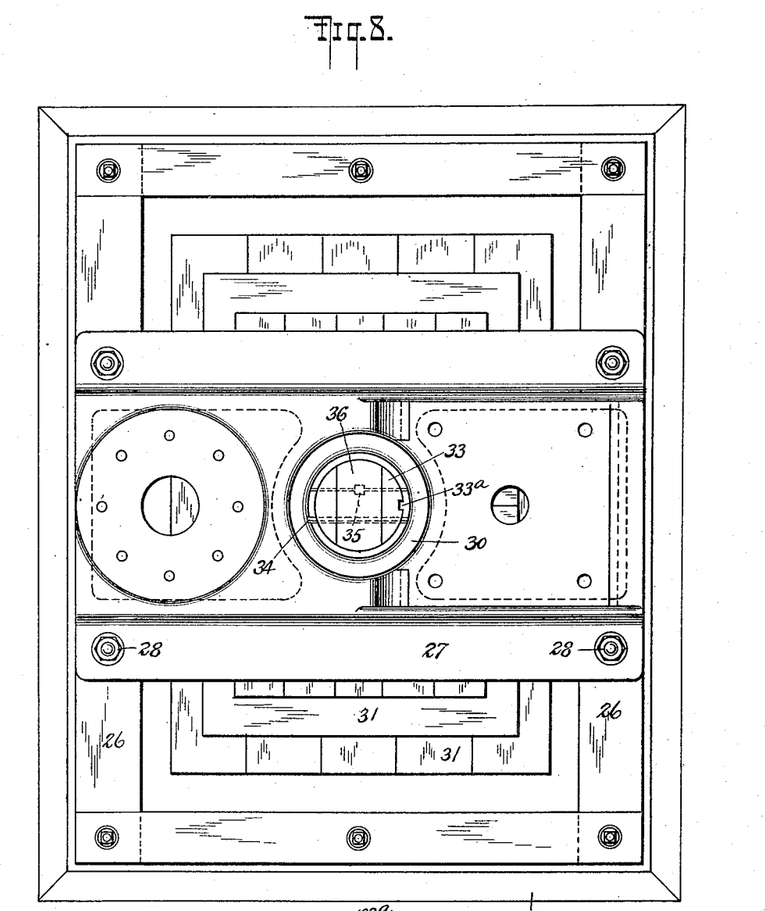
Fig. 8 is a plan view of the foundation of the machine and of the bed plate resting thereon, together with the anvil.

To keep the parts well lubricated, the following arrangements are provided. From a suitable supply pipe 91 oil is fed through cocks 92 to channels or pipes 93 in the stem 84$^a$, of the ejector 84. These pipes lead through a wood plate 93$^a$ to a flexible absorbent wiper 94 secured to the ejector and projecting slightly from the solid portion of the ejector. The lower surface of the plate 93$^a$ is provided with grooves 93$^b$, radiating from the points at which the pipes 93 pass through the said plate. In this manner a better distribution of the oil is secured to the wiper. The projecting portion of the wiper is preferably provided with cuts 94ª, at least at the corners, to enable it to properly fit the mold and to move therein without excessive friction. Thus at each reciprocation of the ejector the walls of the mold temporarily in line therewith will be cleaned and oiled. The ejector proper 84 may be fastened to the stem 84ª by means of screws 84ᶜ passing tightly through the wiper 94 and loosely through holes 84ᵈ of the stem and plate 93ª, thus allowing the ejector 84 and the wiper to adjust themselves laterally by contact with the mold walls. Branch pipes 95 are connected with the supply pipe 91 and from these branch pipes oil may be discharged through cocks 96 into troughs 51ᵍ on the upper surface of the mold table 51, being then conveyed through ducts 51ʰ to the bearing surface of the table seat 54. Oil is also sprayed from perforated heads 97 on wicks 98 (Figs. 4 and 12) wrapped on elastic cores such as pieces of rubber hose 99 and passing through apertures 100ª of plates 100 which are secured to the table 51 between adjacent molds. The upper portion of each wick is adapted to wipe and lubricate the lower surfaces of the follower 50 and of the ejector 84 as they are brought into registry by the rotation of the table. The lower end of each wick 98 projects from the bottom of the table and is kept, by means of a weight 98ª, against the upper surface of the pallet, which it lubricates. The wick 98 also has extensions 98ᵇ which dip into an oil reservoir 101 formed in the table and covered by the plate 100. This plate is held down by nuts 102ª on screws 102 fitted into threaded recesses of the table 51. The screws are tubular and through them slide loosely rods 103ª secured to scrapers 103 which rest on the pallet and clean its surface, the said scrapers having portions disposed at an angle to radial lines (see Fig. 10) so as to convey any dirt to the outer edge of the table. The pallet should be pressed tightly against the table on the feed side, that is adjacent to the two molds shown complete in Fig. 10, but on the opposite side the pallet may be comparatively free and may drop down as shown in Fig. 7ª. The scrapers 103, being loose, will readily follow the pallet up or down. To insure the complete removal of dirt, the pallet section 76 may have a series of perforations 76ᵇ forming a grating at each side of the discharge opening 76ª.

The operation is as follows: The table 51 of the machine shown in the drawing is designed to be rotated clockwise, and the molds are filled with the loose block material when they are in the position shown for one or the other of the upper molds in Fig. 5. In practice, it will be convenient to arrange two machines side by side, with their tables constructed to rotate in opposite directions; only slight changes in the table-locking mechanism would be required for this purpose. The two machines would be placed adjacent to each other with those portions at which the material is filled into the molds. This material may be asphaltic concrete or any suitable mixture, but I have found that with my improved process and machine I can produce blocks of extraordinary strength and durability from rock asphalt, used in a loose heated condition. The loose material filled into the mold will be about twice the volume or bulk of the finished block. The table is then turned to bring the filled mold over the anvil 30, and the oiled follower 50 is lowered slowly to exert a light pressure on the mass in the mold. This follower (weighing about 100 pounds) will not cause the material to splash, but will expel considerable air therefrom and will get a good bearing on the material. The air will escape readily, as the material is quite loose and the follower is in the upper flaring portion of the mold, with ample clearance. Thereupon the hammer 46 (weighing say 800 pounds) is lowered to first press on the follower gently and then by steam pressure (say 6000 pounds or over); this causes the follower to descend farther, pressing the mass at first rapidly and then more slowly as the block becomes more compact and solid. The air space becomes less and less as the follower goes down, but on the other hand there is less air to escape. Finally the follower reaches the uniform lower portion of the mold, substantially as in Fig. 2, and the block then has nearly its final thickness, but still contains an amount of air which must be expelled in order to give the block its final consistency and full efficiency. When the operator sees that the effect of the pressure has about reached its limit, he causes the hammer to strike the follower (still resting on the block) a number of blows sufficient to finish the compression of the mass and the expulsion of the air. Every blow thus struck causes a slight depression of the anvil and die relatively to the mold, sufficient to open a slight gap or crack at the bottom of the mold, for the escape of the air driven out by the force of the blow. By properly adjusting the mold table, I may cause part of its weight to be rested with the mold upon the anvil to prevent the opening caused by the blows of the hammer, from becoming so wide as to allow the material of the block to escape. Some of the air still escapes around the follower. The rebound of the anvil pushes the block back into the mold and thus loosens the block in the mold, allowing air to escape all around the block, and making it easy to push the block out of the mold. The indicator or gage 37ª (Fig. 2) enables the operator to ascertain when the operation is terminated. The heavy blows induce side movements in the mass to fill up any voids, much better than pressure alone can do it. Practically all the air having been expelled, the block is of uniform density throughout. As before stated, the final bulk of the block is only about one-half of the volume of the original loose mixture. The specific gravity of the finished block can thus be raised to about 2.30 and the block, while consisting of nothing but rock asphalt, will have a density 15 per cent. higher than natural rock asphalt. The blocks are very strong and durable and particularly suitable for paving purposes. The blocks are finished while resting on the anvil 30, and by two or three partial rotations of the table they are brought over the opening 76ª and pushed out by the ejector 84, it being understood that the pallet closes the bottom of all the molds except the two which temporarily register with the anvil and with the ejector respectively.

The same machine may be used for making composite blocks consisting of two materials, that is, one material for the top of the block and a different material for its bottom. For instance, the material for the bottom may be brought into the mold at $a$ (Fig. 10) and the upper portion of the mold may then be filled with a different material at $b$, the machine being capable of operation at the same speed whether the blocks be of one material or composite. This is one of the reasons why I employ an apparently excessive number of molds; another advantage flowing from the use of more than the strictly necessary number of molds is that the operators are given more space and freedom of movement, and the additional space is also useful when mechanical feeding devices are used.

In some cases, especially when a design is impressed on the upper surface of the block, it may be preferable to employ a brush 104 (Fig. 19), instead of the wiper or wick 98 of Fig. 12. This brush would receive its supply of lubricant in the same manner as the said wiper.

I claim as my invention:

1. A block-making machine, provided with a mold table having an opening with an enlargement or shelf at the upper end, a mold set in said opening out of contact with the walls thereof and capable of being passed therethrough and provided with a recess in its outer surface, in registry with said enlargement, a lining filling the enlargement and recess and the space between the mold table and the mold, and means for compressing material in the mold.

2. A block-making machine, provided with a mold-table, a mold carried thereby, a bushing located at the center of the table and consisting of sections movable relatively to each other in an axial direction, a stationary support on which the table is mounted to revolve and rock, and means for compressing material in the mold.

3. A block-making machine, provided with a mold-table, a mold carried thereby, a bushing located at the center of the table and having an exterior shoulder or flange at the bottom, the said bushing being divided into sections which come close together at the said flange but are spaced at the inner surface of the bushing, filling strips in said spaces, an annular cushion interposed between the table and bushing and engaging said flange, a stationary support on which the table is mounted to revolve, and means for compressing material in the mold.

4. A block-making machine, provided with a mold-table, a mold carried thereby, a support on which it is mounted to revolve, a bushing located at the center of the table and consisting of sections movable relatively to each other in an axial direction, each of said sections having at its bottom a rounded central projection in engagement with the support, an annular cushion interposed between the table and the bushing, and means for compressing material in the mold.

5. A block-making machine, provided with a mold-table, a mold carried thereby, a split bushing at the center of the table, a stationary support on which the table with the bushing is adapted to revolve, an elastic cushion interposed between the bushing and the table, a cap fitted over said bushing, and means for compressing material in the mold.

6. A block-making machine, provided with a mold-table having a central opening, a mold carried by said table, a sectional bushing set in said opening, an elastic cushion interposed between the bushing and the table, a cap fitted into the opening of the table above the bushing and provided with a flange surrounding the upper ends of the bushing sections, a stationary support on which the table is mounted to revolve, and means for compressing material in the mold.

7. A block-making machine, provided with a revoluble mold table, a mold carried thereby, a stationary table seat for supporting the table, cushions on which the seat rests, means for adjusting the distance between the table and the cushion, and means for compressing material in the mold.

8. A block-making machine, provided with a revoluble mold table, a mold carried thereby, a stationary table seat on which the table rests, screws carrying said table seat, a frame having guides in which said screws may slide up and down but are prevented from turning, adjusting nuts on said screws, and means for compressing material in the mold.

9. A block-making machine, provided with a revoluble mold table, a mold carried thereby, a stationary table seat on which the table rests, screws carrying said table seat, a frame having guides in which said screws may slide up and down but are prevented from turning, adjusting nuts on said screws, cushions interposed between said frame and the nuts, and means for compressing material in the mold.

10. A block-making machine, provided with a revoluble mold table, a mold carried thereby, a stationary seat on which the table rests, a supporting frame, cushions thereon, screw mechanism, interposed between the cushions and the table seat, for adjustably carrying said seat, and means for compressing material in the mold.

11. A block-making machine, provided with a revoluble mold table, a mold carried thereby, a motor having a tendency to turn the table in one direction, means for turning the table manually in said direction, and means for compressing material in the mold.

12. A block-making machine, provided with a revoluble mold table having means for turning it manually, a mold carried by said table, a motor arranged to assist the manual turning of the table, but not to start it independently, and means for compressing material in the mold.

13. A block-making machine, provided with a revoluble mold table, a mold carried thereby, an anvil and compressing mechanism located at one side of said table, and supporting rolls engaging the table at points about 90° from the diameter passing through the anvil.

14. A block-making machine, provided with a revoluble mold-table, a mold carried thereby, an anvil and compressing mechanism located at one side of said table, an ejector located on the opposite side of the table, and supporting rolls engaging the peripheral portion of the table about midway between the ejector and the anvil.

15. A block-making machine, provided with a revoluble mold-table, a mold carried thereby, an anvil and compressing mechanism located at one side of said table, a supporting roll engaging the peripheral portion of the table at a point about 90° from the diameter passing through the anvil, and a driving supporting roll engaging the peripheral portion of the table at a point about diametrically opposite the one engaged by the first-mentioned roll.

16. A block-making machine, provided with a revoluble mold-table, a mold carried thereby, an anvil and compressing mechanism located at one side of the table, and supporting rolls engaging the table at points slightly more than 90° from the diameter passing through the anvil, so that the weight of the table will be greater on the anvil side of said rolls than on the opposite side.

17. A block-making machine, provided with a revoluble mold-table, a mold carried thereby, a pallet yieldingly supported below the table and constructed of loosely connected sections, and means for compressing material in the mold.

18. A block-making machine, provided with a revoluble mold-table, a mold carried thereby, an anvil located at one side of the table, means, coöperating with the anvil, for compressing material in the mold, and a pallet yieldingly supported below the table and provided with a hub embracing the anvil and capable of sliding thereon.

19. A block-making machine, provided with a revoluble mold-table, a mold carried thereby, an anvil located at one side of the table, means, coöperating with the anvil, for compressing material in the mold, and a pallet supported yieldingly below the table and consisting of radially abutting loosely connected sections two of which are provided with portions embracing the anvil and capable of sliding thereon.

20. A block-making machine, provided with a revoluble mold-table, a mold carried thereby, an anvil located at one point of the table's periphery, an ejector located at a different point of said periphery, means, coöperating with said anvil, for compressing material in the mold, and a pallet supported yieldingly below said table and provided with an opening in line with the ejector and with a hub portion embracing the anvil and capable of sliding thereon.

21. A block-making machine, provided with a revoluble mold-table, a mold carried thereby, an anvil located at one point of the table's periphery, an ejector located at a different point of said periphery, means, coöperating with said anvil, for compressing material in the mold, and a pallet supported yieldingly below said table and consisting of loosely connected sections one of which has an opening in line with the ejector while two other sections have portions embracing the anvil and capable of sliding thereon.

22. A block-making machine, provided with a revoluble mold-table, a mold carried thereby, an anvil located at one side of said table, means, coöperating with the anvil, for compressing material in the mold, a pallet yieldingly supported below the table and having a hub embracing the anvil and capable of sliding thereon, and means, such as a key, for preventing the pallet hub from turning relatively to the anvil.

23. A block-making machine, provided with a revoluble mold-table, a mold carried thereby, an anvil located at one side of the table and provided with a die, means, coöp- erating with the anvil, for compressing material in the mold, and a pallet yieldingly supported below the table and having a hub embracing the anvil at the die to hold the die against lengthwise movement, said hub being capable of sliding on the anvil.

24. A block-making machine, provided with a revoluble mold-table, a mold carried thereby, means for compressing material in the mold, and a pallet yieldingly supported below the table and consisting of sections having projections at their adjacent ends, and flexible means wrapped on said projections to connect the pallet sections loosely.

25. A block-making machine, provided with a revoluble mold-table, a mold carried thereby, means for compressing material in the mold, and a pallet yieldingly supported below the table and consisting of sections having projections at their adjacent ends, and flexible means wrapped on said projections to connect the pallet sections loosely.

26. A block-making machine, provided with a revoluble mold-table, a mold carried thereby, means for compressing material in the mold, a pallet located below the table, and crossed springs for supporting the pallet.

27. A block-making machine, provided with a revoluble mold-table, a mold carried thereby, means for compressing material in the mold, a sectional pallet located below the table, and crossed springs for the supporting pallet, each pallet section being connected with at least one of said springs.

28. A block-making machine, provided with a revoluble mold-table, a mold carried thereby, an anvil at one side of the table, means coöperating with the anvil, for compressing material in the mold, a pallet located below the mold and consisting of loosely connected sections, two of said sections meeting at the anvil, and springs for supporting the pallet, each of the sections adjacent to the anvil being supported by one spring, and each of the other sections being supported by two springs.

29. A block-making machine, provided with a revoluble mold-table, a mold carried thereby, means for compressing material within the mold, a pallet located below the table, and springs arranged in parallel pairs extending transversely of each other for supporting said pallet.

30. A block-making machine, provided with a revoluble mold-table, a mold carried thereby, means for compressing material in the mold, a sectional pallet located below the table, springs for supporting the several pallet sections, and means for adjusting the tension of said springs individually.

31. A block-making machine, provided with a revoluble mold-table, a mold carried thereby, means for compressing material in the mold, a pallet located below the table, springs for supporting said pallet, and means for adjusting the springs and table in unison.

32. A block-making machine, provided with a revoluble mold-table, a mold carried thereby, a stationary seat on which said table is supported to revolve, means for compressing material in the mold, a pallet located below the mold-table, springs for supporting said pallet, and means for adjusting the springs and table seat in unison.

33. A block-making machine, provided with a revoluble mold-table, a mold carried thereby, means for compressing material in the mold, a pallet located below the table, in engagement therewith, said pallet having openings for the escape of dirt and the like, and scrapers carried by the table in engagement with the pallet, the edges of said scrapers being disposed obliquely with reference to radial lines.

34. A block-making machine, provided with a revoluble mold-table, a mold carried thereby, means, located at one side of the table, for compressing material in the mold, an ejector for the finished blocks, located at the other side of the table, and a non-rotatable pallet located below the table in engagement therewith, said pallet having an opening in line with the ejector, and apertures at each side of said opening, for the escape of dirt and the like.

35. A block-making machine, provided with a revoluble mold-table having an oil-chamber, a mold carried by said table, a cover for said oil-chamber, hollow means for fastening said cover, rods extending loosely through said hollow means, a scraper carried by the lower ends of said rods, below the table, a wick hanging from said table and extending into the oil chamber, and a non-rotary pallet located below the table and engaged by the said wick and scraper.

36. A block-making machine, provided with a revoluble mold-table, a mold carried thereby, a non-rotary pallet located below the table, in engagement therewith, a wick depending from the table to engage the pallet, means projecting above the table, for receiving lubricant and conducting it to the wick, a stationary device for feeding the lubricant to said means as said device and means come into registry, and mechanism for compressing material in the mold.

37. A block-making machine, provided with a mold, a follower for engaging the material in the mold, a hammer arranged to engage the follower, a hammer rod provided with flat surfaces and located on the side of the hammer opposite to the follower, and rods held to move in unison with the follower and having a limited sliding movement relatively to the hammer, said rods being provided with portions engaging the flat surfaces of the hammer rod to prevent the follower rods from turning on their axes.

38. A block-making machine, provided with a mold, a follower for engaging the material in the mold, a hammer arranged to engage the follower, a hammer rod provided with flat surfaces and located on the side of the hammer opposite to the follower, rods held to move in unison with the follower and arranged to slide through the hammer, and nuts screwed on said rods adjustably on the side of the hammer facing away from the mold, said nuts engaging the flat surfaces of the hammer rod.

39. A block-making machine, provided with a mold, compressing means arranged to enter the mold, and a deflector in conjunction with said compressing means, to throw any loose matter outwardly from the mold.

40. A block-making machine, provided with a mold, compressing means arranged to enter the mold, and a concave-faced deflector arranged adjacent to the compressing surface to throw any loose matter outwardly from the mold.

41. A block-making machine, provided with a mold, a follower for engaging the material in the mold, a hammer arranged to engage the follower, and a deflector arranged on the side of the follower adjacent to the hammer.

42. A block-making machine, provided with a mold, a follower arranged to enter the mold and formed with a lateral deflector, and a hammer arranged to engage the follower.

43. A block-making machine, provided with a mold having a flaring mouth, compressing means arranged to enter the mold, and a deflector in conjunction with said compressing means and flaring mold mouth.

44. A block-making machine, provided with a mold, a follower for engaging the material in the mold, a hammer arranged to engage the follower, and rods pivotally connected with the follower and having a limited sliding movement relatively to the hammer.

45. A block-making machine, provided with a mold, a follower for engaging the material in the mold, a hammer arranged to engage the follower, rods formed with eyes and having a limited sliding movement relatively to the hammer, and keys extending transversely through said eyes and through the follower.

46. A block-making machine, provided with a mold, a follower for engaging the material in the mold, a hammer arranged to engage the follower, rods formed with eyes and having a limited sliding movement relatively to the hammer, bushings or linings within said eyes, and keys extending transversely through the follower and through said linings.

47. A block-making machine, provided with a mold, a follower for engaging the material in the mold, a hammer arranged to engage the follower, rods formed with eyes and having a limited sliding movement relatively to the hammer, and split elastic keys extending transversely through the follower and through said eyes.

48. A block-making machine, provided with a mold, a follower for engaging the material in the mold, a hammer arranged to engage the follower, rods formed with eyes and having a limited sliding movement relatively to the hammer, and split elastic keys beveled at their front ends and extending through the follower and through said eyes.

49. A block-making machine, provided with a mold, a follower for engaging the material in the mold, a hammer for engaging the outer surface of the follower, rods formed with eyes and having a limited sliding movement relatively to the hammer, elastic linings for said eyes, and longitudinally split elastic keys beveled at their front ends and extending transversely through said follower and linings.

50. A block-making machine provided with a revoluble mold table and an anvil at one side of the table, means coöperating with the anvil, for compressing the material in the mold, and a pallet located below the mold and consisting of loosely connected sections, two of which meet at the anvil, one of such meeting sections being capable of a vertical movement relatively to the other.

In witness whereof I have hereunto set my hand in the presence of two subscribing witnesses, this seventh day of February, 1908.

DANIEL BRENNAN, Jr.

Witnesses:
  JOHN LOTKA,
  JOHN A. KEHLENBECK.